H. J. CRINER.
EXHAUST VALVE REGULATOR.
APPLICATION FILED SEPT. 20, 1909.
953,460.
Patented Mar. 29, 1910.
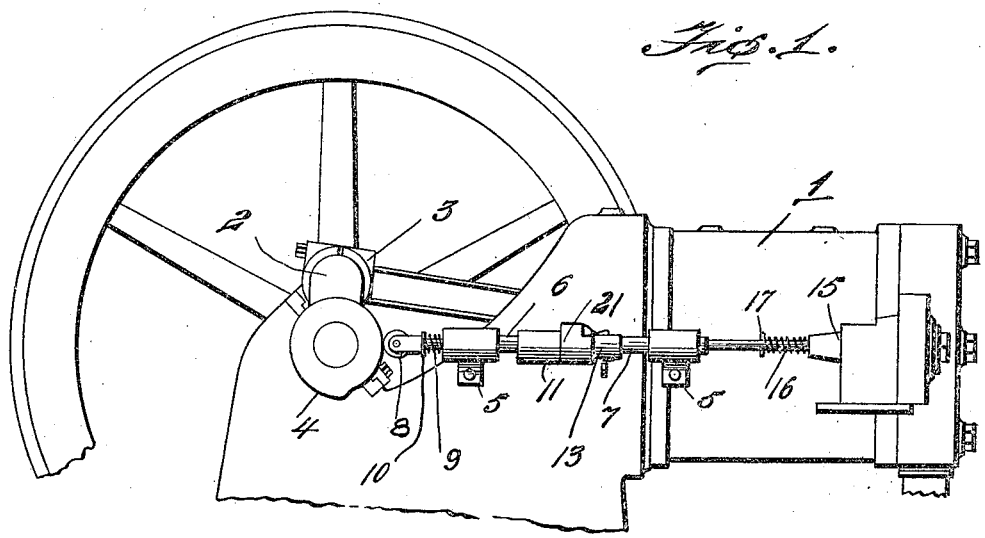
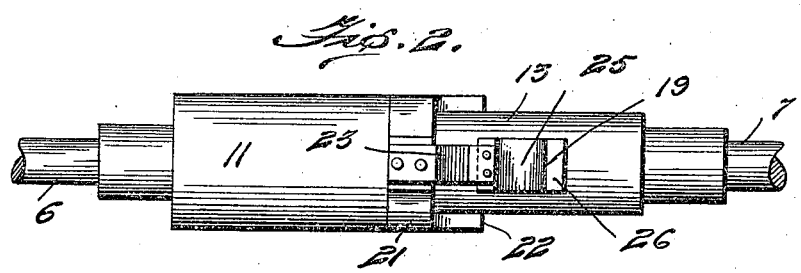
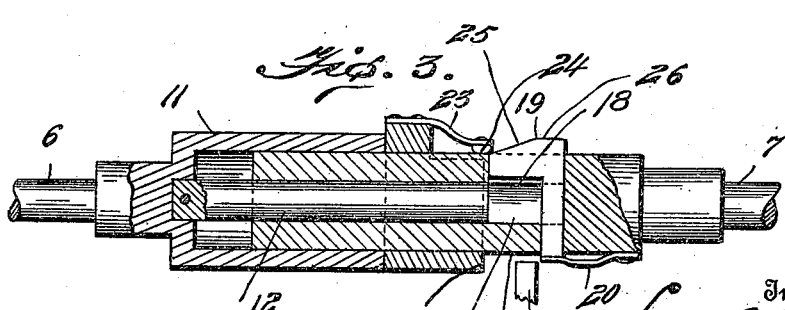
Witnesses
Inventor
Harry J. Criner
By
Attorney

UNITED STATES PATENT OFFICE.

HARRY J. CRINER, OF BURLINGTON, IOWA.

EXHAUST-VALVE REGULATOR.

953,460.

Specification of Letters Patent.  Patented Mar. 29, 1910.

Application filed September 20, 1909.  Serial No. 518,542.

*To all whom it may concern:*

Be it known that I, HARRY J. CRINER, a citizen of the United States, residing at Burlington, in the county of Des Moines and State of Iowa, have invented certain new and useful Improvements in Exhaust-Valve Regulators, of which the following is a specification.

My invention relates to improvements in exhaust valve regulators, and the leading object of my invention is the provision of a device for regulating the valve on a four cycle engine.

To attain the desired object, my invention consists in an exhaust valve regulating mechanism embodying certain novel features of construction and combination and arrangement of parts for service substantially as described and as illustrated in the accompanying drawings.

Figure 1 represents a side elevation of an engine with my device applied thereto. Fig. 2 represents a top plan view of the device on an enlarged scale, and Fig. 3 represents a vertical sectional view on line 3—3 of Fig. 2.

In the drawings, in which similar characters of reference denote corresponding parts in the several views: the numeral 1 designates the engine proper, having journaled in one end the crank shaft 2 operated by any suitable driving connections 3 and bearing on one end the cam disk 4. Secured on the side of the engine are the bearings 5, and mounted in these bearings are the slide shafts 6 and 7, the shaft 6 bearing on its outer end the wheel or roller 8, and having the coiled spring 9 mounted thereon, one end of the spring bearing against the bearing 5 and the other against a suitable abutment 10 on the shaft, said spring serving to force the shaft outward and hold the roller in engagement with the periphery of the cam disk 4.

Secured on the inner end of the shaft 6 is the sleeve 11 having fastened centrally thereof the bar or pin 12, said pin extending in the interior of the sleeve in line with the shaft 6, there being an annular space between the pin and the inner face of the sleeve. Slidably mounted in the sleeve and moving in said annular space is a second sleeve 13 of less diameter than the first sleeve, but having a central socket 14 in which the pin 12 moves. The sleeve 13 is secured on the inner end of the shaft 7, the other end of said shaft being connected to the exhaust valve, shown at 15, there being a coiled spring 16 mounted on the shaft and bearing against the bearing 5 and an abutment 17 on the shaft to force the shaft inward and keep the valve closed.

Formed in the outer end of the sleeve 13 is the slot 18 in which is mounted the angle or L shaped abutment pin 19, said pin being normally pressed upward and the leg of the L being held above the socket 14 by means of a blade spring 20 secured to the sleeve 13 and bearing against the under side of the pin. Mounted on the sleeve 13 interior to the pin 19 is the bushing 21 having the abutment shoulder 22 on its under side and having secured to its upper side the blade spring 23, said spring being considerably stronger than the spring 20. Secured to the under side of the spring 23 is a slide or contact block 24, the use of which will be hereinafter pointed out.

The operation of my device is as follows: On the first cycle stroke of the engine, the part of the cam disk 4 in contact with the roller 8 being a true circle, the shaft 6 does not move and the device remains in the position shown in Fig. 3, the exhaust valve being closed. On the second cycle stroke, however, the roller being in contact with the cam portion of the disk, the shaft 6 is forced inward, the center pin 12 passing under the leg of the pin 19. Just after the pin 12 has reached this position the sleeve 11 comes into contact with the bushing 21 and forces it inward, the block 24 sliding upward on the inclined face 25 of the pin 19 and finally coming to rest upon the flat portion 26 of the pin, at the same time the pin 12 being forced inward until it strikes the portion of the pin 19 which lies at the end of the socket 14, this occurring at the end of the second cycle stroke. At the third cycle stroke the roller drops to the circular portion of the periphery of the cam disk and the shaft 6 moves outward forced by the spring 9, said shaft carrying with it the sleeve 11 and pin 12. The bushing 21, however, not being attached to the sleeve, remains in its inwardly pressed position, the blade spring 23 bearing down upon the pin 19. As the pin 12 is drawn from under the leg of the pin 19, this pin which has hitherto been supported thereby is forced downward by the action of the spring 23 which is stronger than the spring 20, and the end of the leg of the pin 19 now lies in and fills the end of the socket 14, as will be readily understood by reference to Fig. 3. At the beginning of the fourth or last cycle stroke the pin 12 is forced into contact with this projecting leg of the pin 19 and as it is pushed thereagainst forces the shaft 7 back and opens the exhaust valve. As the shaft 6 moves inward on this stroke, the abutment shoulder 22 of the bushing is brought into contact with the stationary pin 27 projecting from the engine and the continued movement of the shaft forces the bushing outward until the spring 23 is out of engagement with the pin 19, said pin being retained in its depressed position by frictional engagement caused by the force exerted against the shaft 6 by the cam 4 and the resistance thereto of the spring 16 on the shaft 7.

From the foregoing description taken in connection with the drawings it will be apparent that at the beginning of the first or scavenger stroke of the engine the exhaust valve is open, while as the stroke continues, the roller drops from the cam portion of the disk to the true circular portion thereof and allows the shaft 6 to move outward, which movement in turn permits the shaft 7 to move inward and close the valve. As the shaft 6 moves outward it relieves the pin 19 of the pressure thereon, and the bushing 21 having been previously forced out of engagement therewith by the pin 27, the pin 19 is forced upward by the spring 20 into the position shown in Fig. 3, the parts all occupying the positions shown in this view at the end of the first cycle stroke, as will be understood from the foregoing description.

The operation and advantages of my device will be readily apparent to all familiar with the art, and it will be seen that I provide a simple, strong and durable device of the highest efficiency for the desired purpose.

I claim:

1. In a device of the character described, the combination with the valve rod, of a sleeve carried thereby, an abutment carried by the sleeve and vertically movable in a slot formed therein, and means operated by a cam on the engine shaft for moving said abutment into position and contacting therewith to operate the valve at stated intervals.

2. In a device of the character described, the combination with the valve rod, of a sleeve secured on the free end thereof, said sleeve having a slot formed therein, an L-shaped abutment mounted in the slot, a spring for normally holding the thicker portion of the abutment out of the bore of the sleeve, means for overcoming the spring to force said portion of the abutment into the bore of the sleeve, and means adapted to contact with the abutment when in said position to operate the valve.

3. In a device of the character described, the combination with the valve rod, of a sleeve carried thereby, said sleeve having a slot formed therein, a pin mounted in the slot and having an abutment shoulder, a spring for normally holding said shoulder out of the bore of the sleeve, a reciprocally moving rod, means operated thereby and slidably mounted in the bore of the sleeve, means operated by the rod for overcoming the force of the spring and forcing the abutment shoulder into the bore of the sleeve where it will be contacted with by the slidably mounted means, said contact forcing the valve rod back and opening the valve, and means for returning the various parts to normal position.

In testimony whereof I affix my signature, in presence of two witnesses.

HARRY J. CRINER.

Witnesses:
C. N. NELSON,
J. E. CRINER.